United States Patent Office 3,183,441
Patented May 11, 1965

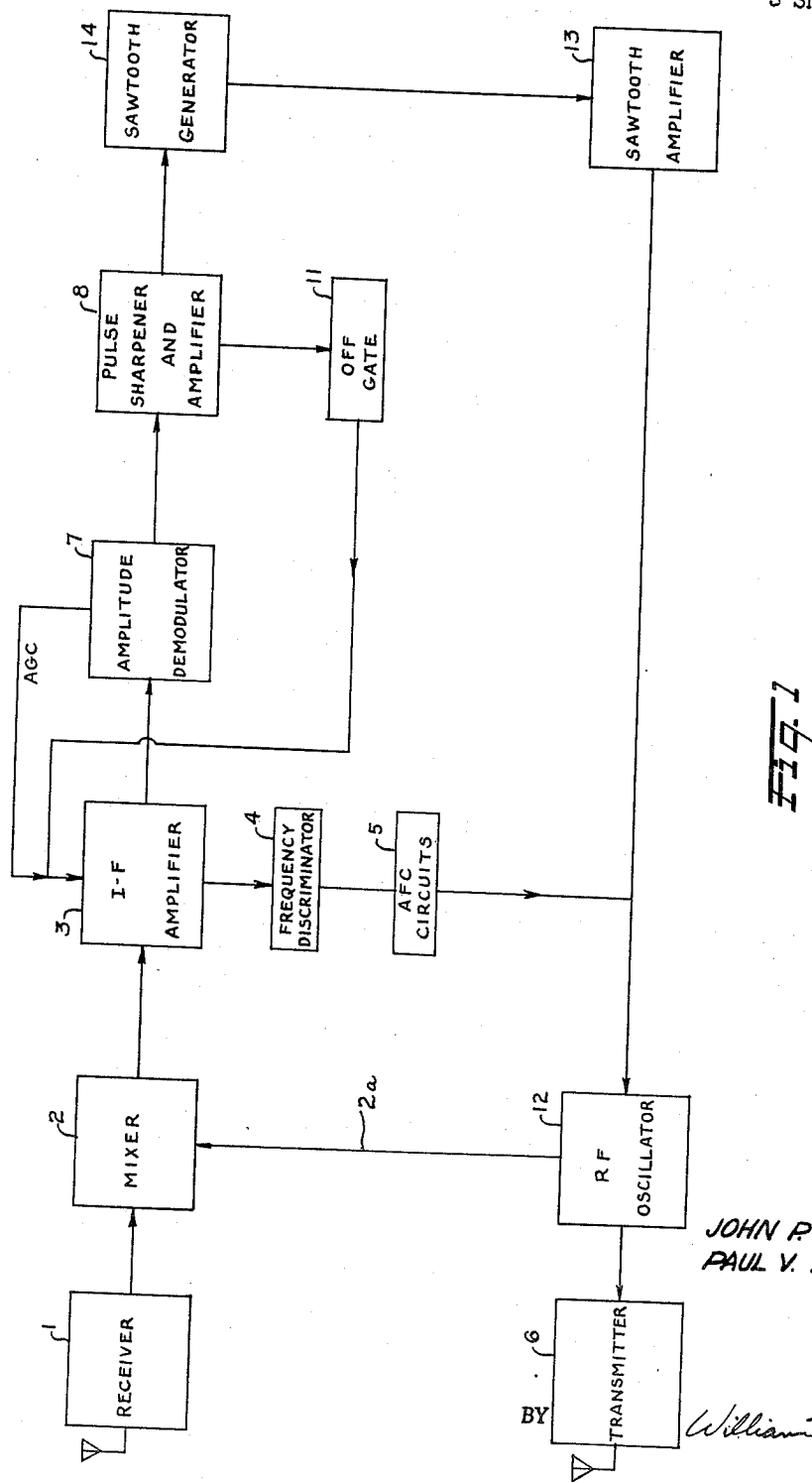

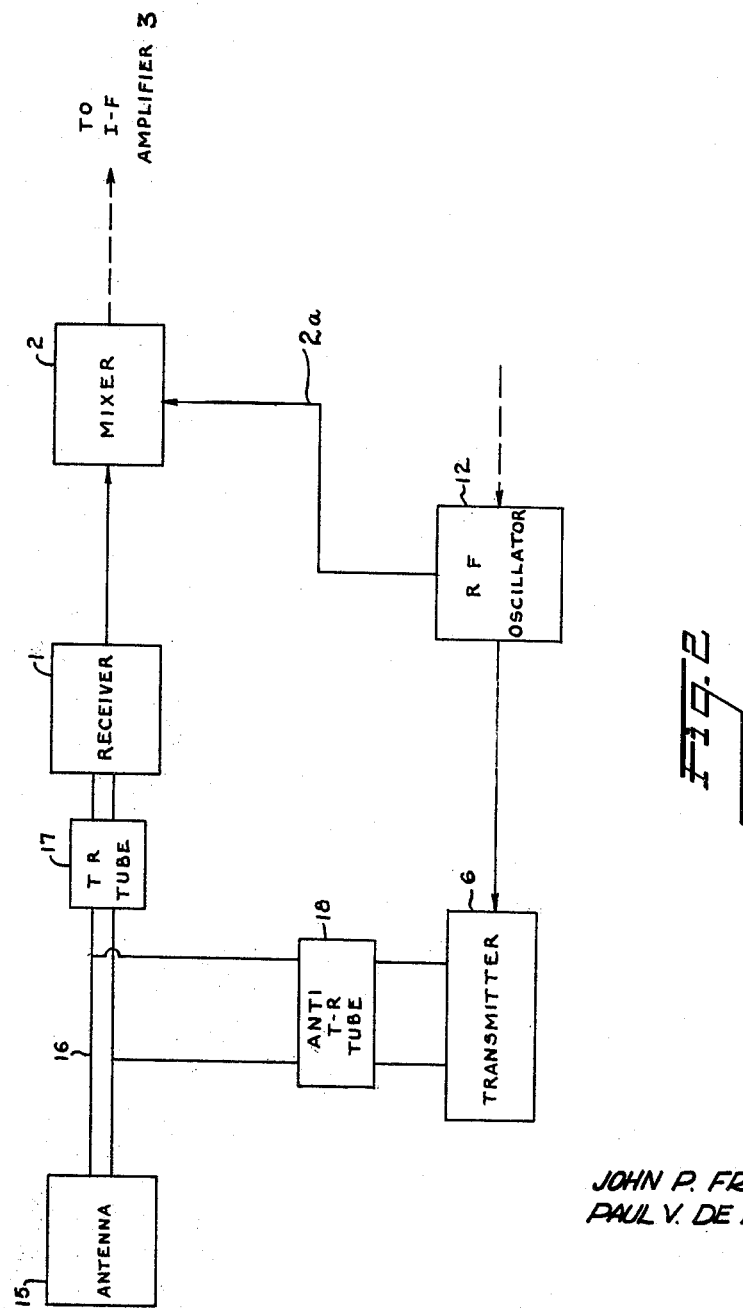

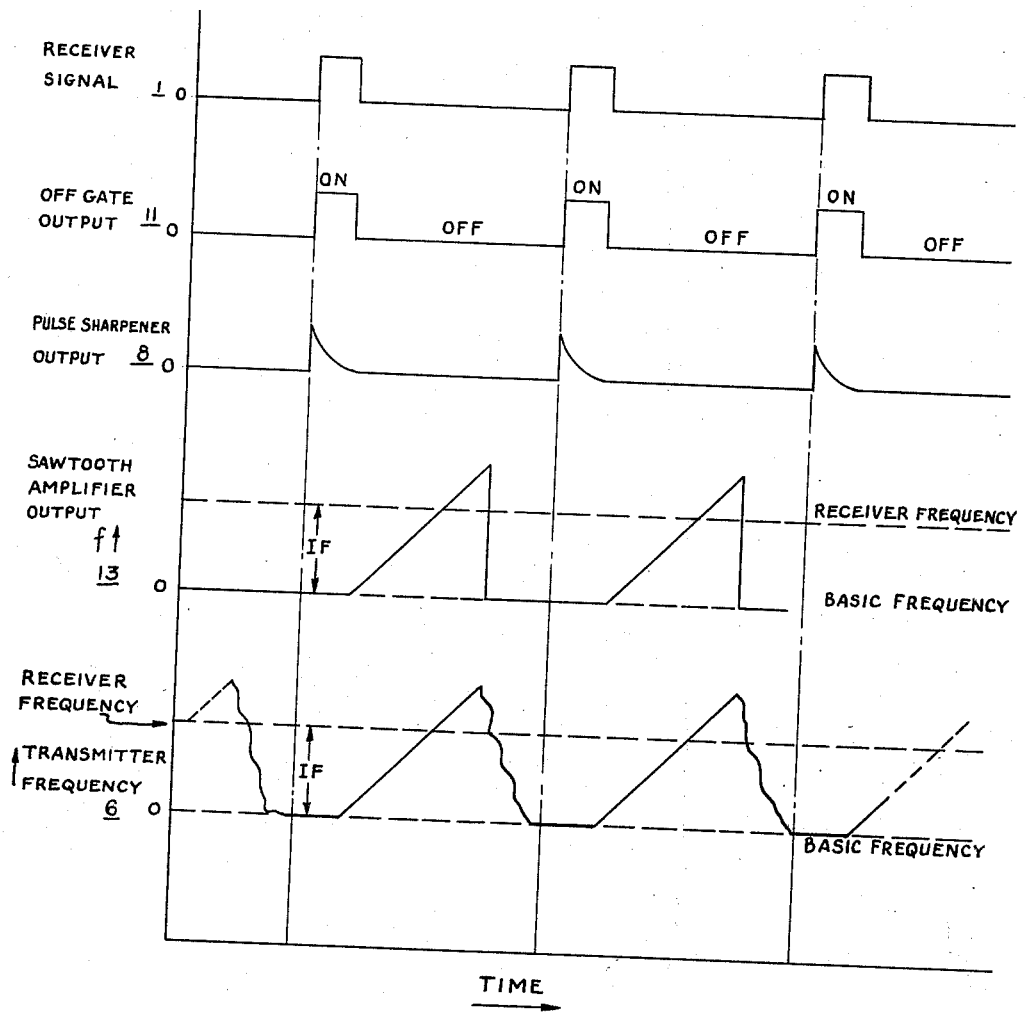

3,183,441
TRANSPONDER AUTOMATIC FREQUENCY CONTROL SYSTEM
John P. Francis, Catonsville, Md., and Paul V. de la Cova, Jackson, Mich., assignors to Martin Marietta Corporation, a corporation of Maryland
Filed July 12, 1961, Ser. No. 123,482
6 Claims. (Cl. 325—13)

This invention relates to pulse signaling repeater systems of the transponder type which are actuated to produce electrical energy signals in response to the reception of similar or related energy signals from some remote source. More specifically, the invention comprises an improved transmitter-receiver for use in radio communication systems.

A system of this type has particular utility in conjunction with airborne tracking radar systems used, for instance, aboard guided missiles. In a representative installation, the transponder is carried by the missile and is arranged to receive signals from and transmit signals to a central control radar set aboard an airborne control center. The airborne control center, accordingly, simultaneously tracks a ground moving target as well as the missile which is being guided toward the target.

The transponder, when used in conjunction with a tracking radar system, will allow the radar of said system to receive and track a non-responsive object and to simultaneously track transponder equipped, signal-emitting objects without interfering with the tracking of said non-responsive object. Such a radar system may be carried airborne and is capable of tracking a ground object, for instance, a military truck. A guided missile equipped with a transponder may be launched by the aircraft and the missile may be guided to the target by an operator observing the tracking of both the truck and the missile on the radar screen. The transponder includes a local oscillator circuit whose oscillation frequency is automatically controlled from received radar signals. The local oscillator also serves as the signal generator source or transmitter for the transponder and by the teaching of this invention, the transponder is caused to radiate a signal which may be received by the tracking radar system.

Known transponder systems are inadequate to meet the present requirements of utmost utility and still be of lightweight construction. Systems now available are inappropriate to present needs since they necessitate additional essential equipment in the form of motors and polarized relays for their operation in the transponder or the control radar set. Elimination of these mechanical elements also overcomes the consequences resulting from their malfunction, such as, failure of mission by loss of missile track or loss of target track or both. Furthermore, in view of the known type of construction, it has been necessary for the transmitter and receiver in a transponder system to be operated at different controlled frequencies requiring a second set of receivers at the control radar set.

Accordingly, it is the primary object of the invention to provide an automatic frequency control system for a transponder in which a single source of radio frequency energy is utilized for the transmitter, as well as using the energy to function as a local oscillator for the receiver.

It is another object of the invention to provide a transponder capable of coincident reception and transmission of energy while at the same time eliminating the necessity of a separate local oscillator for the mixer in the receiver with the attendant advantages of reduction in weight, size, cost and power consumption.

It is a further object of the invention to control the transponder frequency in relation to the frequency of an interrogating radar set. This has the advantage of fixing the transponder frequency at the frequency which may be received by the control station radar.

It is an additional object of the invention to provide a transponder that is less susceptible to radio jamming. The desirable result is obtained by deactivating the intermediate frequency amplifier during such times as the radio frequency generator is being swept and during most of the period between interrogation pulses thereby decreasing the possibility of such jamming.

It is a still further object of the invention to include in the system organization a modification in which an antenna connected in common to both the receiver and the transmitter may be utilized.

Other and further objects and features of the present invention will become apparent upon a careful consideration of the accompanying drawings and description wherein:

FIG. 1 shows in block diagram a typical schematic embodiment of a transponder having the features of the present invention.

FIG. 2 is a block diagram of a modification of an embodiment of the present invention.

FIG. 3 illustrates a graph of the waveforms at selected locations in the circuitry of an embodiment of the present invention as a function of time.

As shown in FIG. 1, a transponder receiver 1 receives interrogation pulse signals transmitted in a well-known manner from a radar set (not shown). The interrogation signals may be of a fixed frequency and they are applied to the mixer 2. The mixer 2 also receives signal energy simultaneously from the local oscillator 12 over conductor 2a. While a klystron oscillator is generally used as the local oscillator in addition to serving as the transmitter radio frequency source for the transmitter, such design is intended to be exemplary only. Any radio frequency oscillator having a frequency capable of being voltage-controlled may be used. Several examples of this type of oscillator are klystrons, magnetrons, or backward wave oscillators. The mixer 2 then converts the two input signals to a different frequency in the well-known manner. This difference, or beat frequency signal, constitutes the receiver intermediate frequency. It may be noted at this point that the signal frequency is heterodyned with the same oscillator frequency from frequency radio oscillator 12 which serves as the radio frequency generator for a transponder transmitter 6. This novel feature will be discussed more fully hereinafter. The mixer output is applied to the intermediate frequency amplifier 3.

The intermediate frequency amplifier 3 may be of conventional design and may comprise any one of several well-known amplifiers. The intermediate frequency amplifier has two output channels: one is connected to a frequency detector or discriminator 4 and the other is connected to an amplitude demodulator 7 for producing an output proportional to the modulation of the difference frequency. The frequency discriminator is used to develop a signal means (not shown) for automatically tuning the receiver. The output of the discriminator is connected to the input of AFC (automatic frequency control) circuits 5. The AFC circuits measure or are capable of sensing changes in the difference frequency and then use the changes in the difference frequency to establish a reference voltage which controls the basic frequency of the transmitter 6. The reference voltage also sets a D.C. level of electronic tuning means (not shown) for the radio frequency oscillator 12. The radio frequency oscillator is, accordingly, maintained at a constant difference frequency from that of the incoming signal.

The input of the amplitude demodulator 7 receives the intermediate frequency amplifier output and performs at least two functions to said output. First, it provides a rectified output thereof which is proportional to the original modulation of the amplitude modulated carrier, and that is applied to the pulse sharpener and amplifier 8; and second, it supplies an automatic gain control (AGC) voltage to an off gate 11 for deenergizing the intermediate frequency amplifier and controls the gain of the intermediate frequency amplifier 3 which gain is developed in accordance with the strength of the incoming signal. Any variations in signal strength caused by fading are thereby corrected.

The pulse sharpener and amplifier 8 has therefore an output used to trigger the off gate 11 and the off gate in turn deenergizes the intermediate frequency amplifier 3 during the time that the radio frequency generator is being swept, and for most of the period between interrogation pulses. This mode of operation, accordingly, fulfills one of the objects of the invention in that the transponder is rendered less susceptible to jamming. The transmitter cannot be affected by the receipt of an erroneous signal because the intermediate frequency amplifier is inoperative to pass signals during transmission. The circuit operation and function is more readily understood by the signal-time graphs of FIG. 3.

The other output signal of the pulse sharpener and amplifier 8 triggers a one shot sawtooth generator 14. The sawtooth voltage waveform is amplified in a sawtooth wave voltage amplifier 13 in order to produce a sweep signal. It is noted from a study of these graphs that during the time that there is no output from off gate 11, an output from the sawtooth amplifier 13 is present. It is also to be noted at this point that the sawtooth voltage has the same basic voltage characteristic as that mentioned hereinbefore in connection with the radio frequency oscillator 12. The sawtooth amplifier produces an output signal which is connected to the radio frequency oscillator for causing it to sweep in frequency by an amount somewhat greater than the extent to which it is tuned off from the incoming signal. That is, the sweep signal is greater in scope than the intermediate frequency signal as shown in FIG. 3. In so doing, the radio frequency oscillator will sweep through the pass band of the radar interrogator signal. The transponder will, therefore, always emit a signal which can be received by a radar control center.

As referred to above, the radio frequency oscillator 12 performs the dual function of supplying radio frequency energy to the transponder transmitter 6 and, in addition, serves as the local oscillator for the mixer 2. As noted hereinbefore, and as emplified by FIG. 3, the basic voltages of the sawtooth amplifier 13 and the transmitter 6 are substantially equal. In this manner, it is possible to use a frequency modulated signal and sweep the output of the transmitter through the frequency range of the received signal An embodiment of the subject invention which includes a common antenna connected for both the receiver and the transmitter of the transponder is illustrated in FIG. 2. In this modification, the transponder receiver 1 and transponder transmitter 6 are connected to a common antenna 15 through an interconnecting waveguide or means 16. In such an arrangement it is necessary to employ duplexing devices or transmit-receive (T-R) circuits for the purpose of preventing the flow of damaging amounts of power to the receiver during transmission without, at the same time, excessively reducing the receiver input characteristics during reception. The duplexing devices used in this modification are set forth merely as an example of an embodiment of the invention. It will be well understood by those versed in the art that additional duplexing devices such as directional couplers might be utilized.

The interconnecting means 16 between the receiver and the transmitter and the common antenna comprise transmit-receive tube 17 and anti-transmit-receive tube 18, respectively. Such tubes are well-known in the art as constituting air gaps for appropriately passing certain levels of energy. It is equally well-known that the anti-T-R gap 18 is a quarter-wavelength branch and that said anti-T-R gap is spaced a quarter-wavelength from the transmitter-receiver junction. It may be parenthetically noted that it is possible to use only the T-R tube 17 but this necessitates a careful adjustment of the distance between the transmitter and the transmitter-receiver junction in interconnecting means 16. The latter distance is not critical in the circuitry of FIG. 2.

During reception by the transponder receiver 1, the anti-T-R tube 18 produces an effective short circuit at the transmitter-receiver junction, and thereby prevents a power loss to the transmitter. As is also well-known to those skilled in the art, this short-circuit appears as an open circuit at the antenna-receiver junction a quarter-wavelength away. When the transponder transmitter is in operation, both tubes are short-circuited. However, the short circuits are a quarter-wavelength from the transmitter-antenna junction and present an infinite impedance across the transmitter-antenna line. Accordingly, negligible power is diverted.

The graphs of FIG. 3 are included to interpret the circuit functions at various points in the transponder. The receiver and off gate signal plots exemplify the fact that the off gate only energizes the I-F amplifier when an interrogation signal is being received. The sawtooth generator triggering signal is shown in the graph of the output of the pulse sharpener and amplifier 8. The sawtooth amplifier 13 and the transmitter 6 each operate with the same basic and intermediate frequencies, also as shown in FIG. 3.

From the foregoing description it is apparent that considerable modification of the features of this invention is possible but it is to be understood that the invention is not limited to this precise circuit device or system of apparatus and that changes may be made therein without departing from the scope of the invention which is defined in the appended claims.

What we claim is:

1. A transponder comprising a radio receiver connected to an antenna to receive a pulsed radio signal of a first frequency, means to generate a radio signal of variable frequency for transmission from another antenna connected thereto, means to heterodyne said pulsed and variable frequency signals in order to produce a difference signal which is the difference between said pulsed and variable frequency signals, amplifying means to reproduce said difference signal, means for deriving an output proportional to changes in said difference signal, means in response to said deriving means to produce a reference voltage, interconnecting means between said generating means and said reference producing means, means connected to the output of said amplifying means having an output proportional to the modulation of said difference signal, gating means connected to said proportional means and being operative to place said amplifier in alternative operative and inoperative states, means responsive to the proportional means for applying an amplified sweep signal to both said generating means and to said interconnecting means, said interconnecting means having an output present only when said amplifier is in said inoperative state, said output of the interconnecting means being of said first frequency.

2. The transponder of claim 1, wherein said receiver connected antenna and said generating means connected antenna are the same antenna, and having means for switching the flow of damaging amounts of power away from said receiver during said transmission in said inoperative state without substantially reducing the input characteristics of the receiver during said operative state.

3. A transponder comprising a radio receiver connected to an antenna for receiving a pulse radio signal having a first carrier frequency, means to generate a variable frequency radio signal, heterodyne means responsive to said pulsed and variable signals together during periods of time in which said pulsed signal is being received and being operative to produce a heterodyne signal which is the difference between said pulsed and variable signals, an amplifier to amplify said heterodyne signal, demodulator means connected to said amplifier for deriving an output voltage proportional to deviations of said heterodyne signal from a certain value, discriminator means to measure said heterodyne signal and produce an output reference voltage proportional to said difference frequency, wave generation means responsive to said demodulator means as affected by said discriminator means with the reference voltage produced thereby being applied to said generator means, transmission means for producing an output at said first carrier frequency which is proportional to the modulation of said heterodyne signal, gating means connected to said demodulator means and being operative to control the energization state of said amplifier, means responsive to said demodulator for applying an amplified sweep signal to said generating means and said transmission means, the output of said transmission means being present only when said amplifier is deenergized and said output is at said first carrier means.

4. A transponder comprising a receiver connected to an antenna for receiving a pulsed radio signal having a first carrier frequency, a klystron oscillator to generate a variable frequency radio signal, a mixer circuit to heterodyne said pulsed and variable signals together during periods of time in which said pulsed signal is being received, said mixer being operative to produce a mixer signal which is the difference between said pulsed and variable signals, a means to amplify said mixer signal, a frequency discriminator for deriving an output control voltage signal which is proportional to deviations of said mixer frequency signal from a predetermined value, an automatic frequency control circuit responsive to said control voltage signal which measures said difference frequency and produces an output reference voltage signal proportional to said difference frequency, a transmitter connected to said automatic frequency control circuit through said klystron oscillator so that said reference voltage signal is applied to both said transmitter and to said klystron oscillator for transmission from an antenna to which it is connected, an amplitude demodulator for producing an output which is proportional to the modulation of said mixer signal, a pulse sharpener connected to receive the output from the amplitude demodulator, an off gate triggered in response to the output of the pulse sharpener, said off gate being effective to control the energization of said amplifier means, a sawtooth wave generator connected to the output of said pulse sharpener, a sawtooth wave amplifier responsive to said sawtooth wave generator to produce a sawtooth wave voltage, said sawtooth wave amplifier being connected to said klystron oscillator to supply a sweep signal to said oscillator, the output pulse of said transmitter producing an output pulse at said first carrier frequency and being emitted only when said off gate prevents the passage of said mixer signal.

5. A transponder of the type set forth in claim 4, further including antenna means connected in common to both said transmitter and said receiver.

6. A transponder of the type set forth in claim 5, wherein said antenna means comprises directional means for preventing the passage of energy to said transmitter while said pulsed radio signal is being transmitted to said receiver and, further wherein said directional means prevents a flow of energy to said receiver when the output pulses of said transmitter are being emitted.

References Cited by the Examiner
UNITED STATES PATENTS

| | | | |
|---|---|---|---|
| 2,477,585 | 8/49 | Dodington | 325—9 |
| 2,706,244 | 4/55 | Kuder | 325—8 |
| 2,958,767 | 11/60 | Labin et al. | 325—132 |
| 2,985,754 | 5/61 | Grieg et al. | 325—132 |

DAVID G. REDINBAUGH, *Primary Examiner.*